April 18, 1961     B. E. WILLIAMS     2,980,010
ELECTRIC COOKING DEVICE
Filed Jan. 29, 1959                            2 Sheets-Sheet 1

INVENTOR
BEVERLY E. WILLIAMS
BY Cameron, Kerkam & Sutton
ATTORNEYS

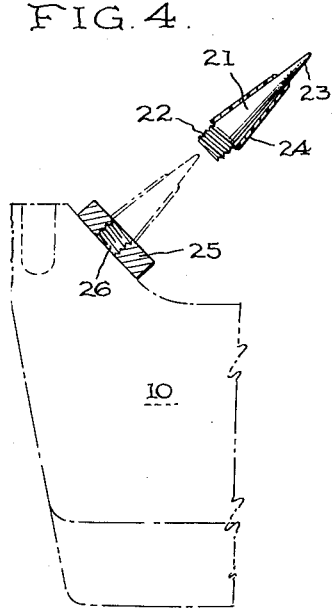
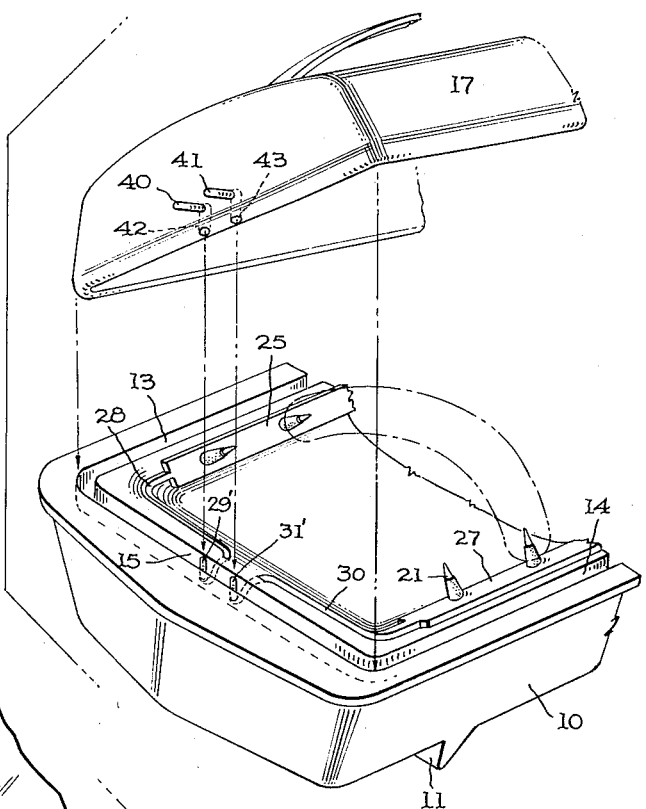
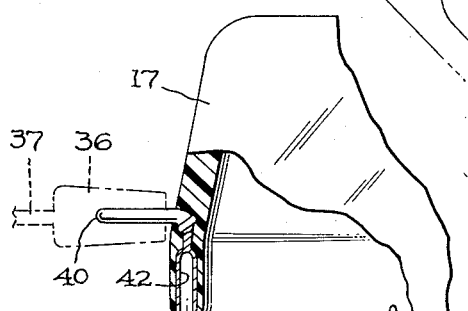
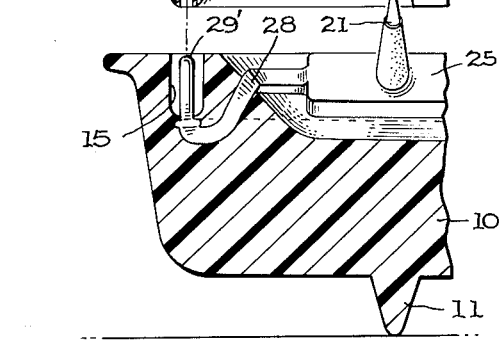

United States Patent Office 2,980,010
Patented Apr. 18, 1961

2,980,010

ELECTRIC COOKING DEVICE

Beverly E. Williams, La Grange Park, Ill., assignor to Hodges Research and Development Company, New York, N.Y., a corporation of California Filed Jan. 29, 1959, Ser. No. 789,874

9 Claims. (Cl. 99—337)

This invention relates to electric cooking devices and more particularly to such devices for simultaneously cooking a plurality of elongated food products such as frankfurters.

Heretofore various electrical cooking devices for elongated food products such as frankfurters have been proposed in which the frankfurters are impaled upon opposed electric contacts so that electric current may be passed through the food product to cook the same. These prior art devices have disadvantages which have prevented commercial acceptance. In some of these the electric contacts are such that the food product is charred when current is passed therethrough creating an undesirable flavor. In others cleaning the cooker is difficult and in others the construction is such that the user may be subject to electric shock if the cooker is handled carelessly.

It is therefore an object of the present invention to provide a novel electric cooking device for elongated food products such as frankfurters in which a plurality of the food product can be cooked simultaneously which overcomes the disadvantages of the prior art structures.

Another object is to provide such a cooking device which may be readily cleaned after use.

Another object is to provide such a cooking device which is so constructed and arranged that the user is completely protected from the hazards of electric shock.

Another object is to provide such a cooker in which the electric contacts upon which the food product is impaled are coated so that charring of the food product is minimized or prevented with consequent enhancement of the taste of the cooked food product.

Another object is to provide such a device which is of pleasing appearance and which may be readily and relatively cheaply manufactured to meet the demands of commercial competition.

Another object is to provide such a cooking device which from the point of view of safety and strength of construction will meet the requirements of the various safety codes.

Another object is to provide such a device which is easily used by the inexperienced and by children without risk.

Other and further objects of the present invention will appear from the following description of an illustrative embodiment thereof.

The novel electric cooking device of the present invention is capable of various mechanical embodiments one of which is shown in the accompanying drawings and is described hereinafter to illustrate the invention. This illustrative embodiment of the invention should in no way be construed as defining or limiting the same and reference should be had to the appended claims to determine the scope of this invention.

In the accompanying drawings, in which like reference characters indicate like parts, Fig. 1 is a view from above of an embodiment of the electric cooking device of the present invention it being noted that the cover is in closed position and is broken away in part to show the interior thereof.

Fig. 4 is an enlarged view of a coated electric contact as seen in Figs. 1–3;

Figs. 6 and 7 are views of another type of electrical switch mechanism suitable for use in the present invention.

Figure 1:
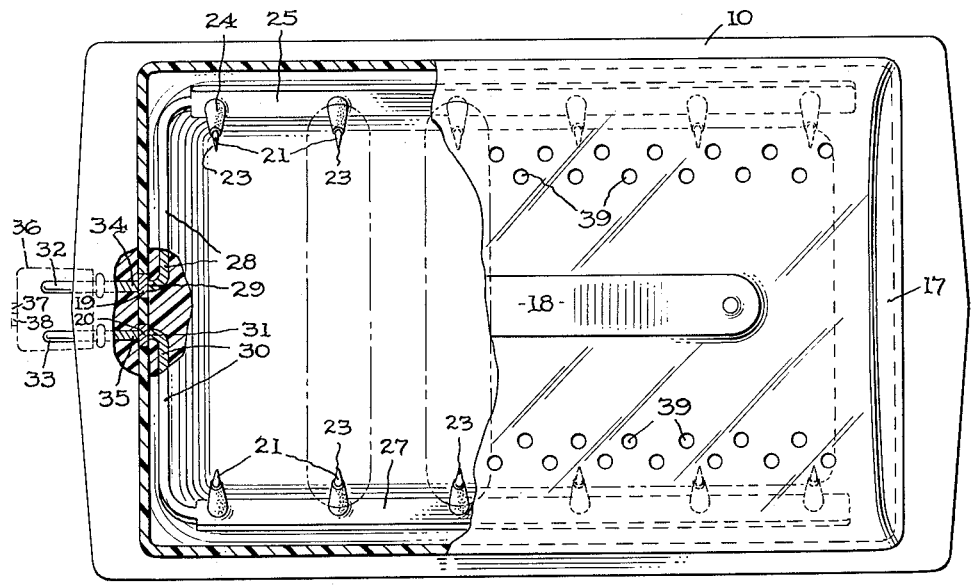

Referring now to the several figures, the electrical cooking device of this embodiment includes a more or less rectangularly shaped dish-shaped base 10 having suitable supporting feet 11.

Base 10 may be of any suitable dimensions and depth and is here shown of a size to cook six food products at one time. Member 10 may be made of any suitable material and is preferably cast from a non-inflammable plastic.

The open top of base 10 is dish-shaped at 12 to catch juices during cooking and a continuous groove is formed in base 10 around dish 12 having side portions 13 and 14 and end portions 15 and 16.

A dish-shaped lid 17 preferably cast of non-inflammable plastic material is provided for base 10 and is so shaped that when in closed position it rests upon base 10 and its lower edges enter and fit singly in grooves 13, 14, 15, and 16. Lid 17 has any suitable handle 18.

Downwardly depending metallic extensions 19 and 20 are formed on or secured to the lower edge of one end of lid 17 for purposes which will appear more fully hereinafter. Cover or lid 17 is provided with suitable apertures 39 which are let therein adjacent the electrical contacts so that steam and cooking vapors may have ready exit from the cooking device.

A plurality of spaced electric contacts 21 of zinc or other suitable metal are mounted in dish 12 and are arranged in pairs in opposed relationship so that the elongated food product to be cooked may be mounted between opposed contacts 21 of each pair. It is to be expressly understood that as many pairs of contacts 21 as may be required may be used and that the six pairs of contacts 21 here shown are illustrative only.

Each contact 21 includes a cylindrical threaded base 22 (Fig. 4) having a centrally disposed upstanding pointed pin 23. With this construction when an elongated food product such as a frankfurter having rounded ends is to be cooked pin 23 impaled the end of the food product axially. Pin 23 is preferably coated with a suitable insulating cover 24 extending approximately two-thirds of its length so that the tip of pin 23 which is well within the food product provides the electric contact 40 to prevent charring of the food product during cooking.

A bus bar 25 of zinc, copper or other suitable metal extends along one side of dish 12 and is suitably secured thereto and each of electrical contacts 21 is electrically connected to bus bar 25 by threaded portion 22 which is seated in a suitably threaded opening 26 in bus bar 25. A similar bus bar 27 extends along the other side of dish 12 and is electrically connected to its electric contacts 21 as described above. Bus bar 25 is provided with an extension 28 which is mounted in one end of base 10 and terminates at 29 and bus bar 27 is provided with a similar extension 30 which is mounted in the same end of base 10 and terminates at 31, end 29 being spaced from end 31.

Figure 2:
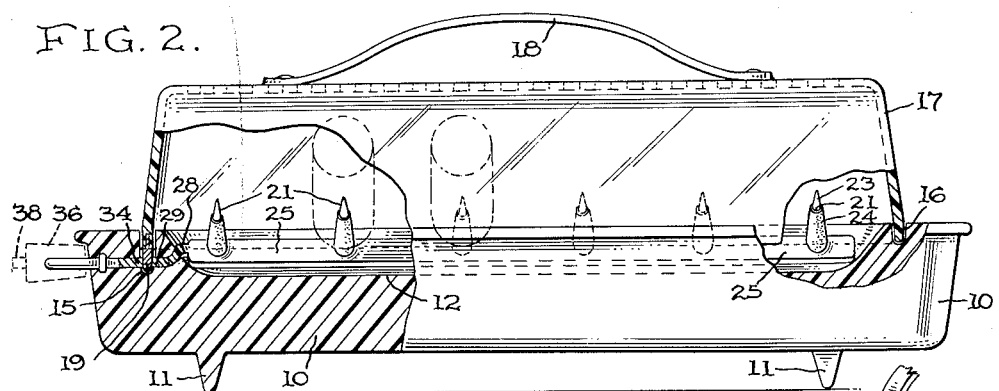
Fig. 2 is a side view, partially in section of the embodiment of Fig. 1.
Figure 3:
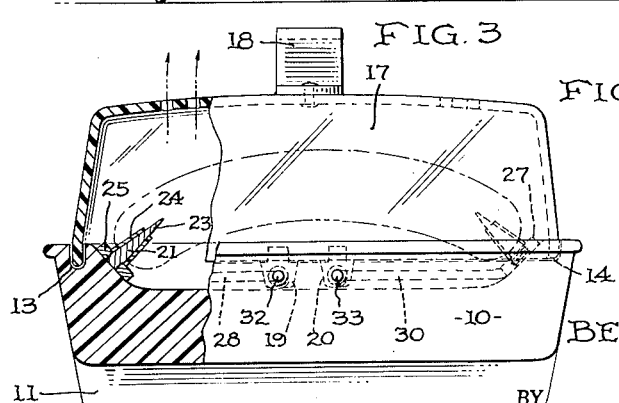
Fig. 3 is an end view, partly in section, as seen from the left in Fig. 1.
Figure 5:
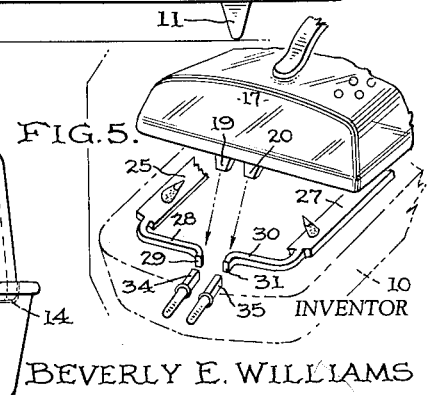
Fig. 5 is a view of the electric switch located in the left end of the embodiment of Fig. 1 to show the construction thereof.

Referring now to Figs. 1, 2 and 5, the electric switch structure there disclosed includes a pair of prong-type electrical contacts 32 and 33 of conventional design are mounted in base 10 opposite and terminating short of ends 29 and 31, respectively, at 34 and 35. Any suitable plug type manually removable contact 36 provides electric current to contacts 32 and 33.

When top 17 is placed in position on the top of base 10 and is aligned so that its lower edges enter grooves 13, 14, 15 and 16 to lock the top in position with respect to base 10, metallic extensions 19 and 20 enter the slots or spaces between ends 29 and 34 and between ends 31 and 35 thus completing the electrical circuits to bus bars 25 and 27. A necessary safety feature is thus provided which prevents electric current from being supplied to electrical contacts 21 before top 17 is firmly locked in position in the grooves on the top of base 10 and before top 17 is completely closed.

Electric current is supplied from any suitable source through wires 37 and 38 which are electrically connected to plug 36.

When lid 17 is fully closed so that electric current is supplied to contacts 21 the lower edges of lid 17 extend into grooves 13, 14, 15 and 16 to prevent the insertion of a utensil or other electrical conductor within the cooking device so that a user of the device cannot receive an electric shock by accidental contact with one of the electric contacts 21. If lid 17 is raised sufficiently to permit the insertion of a utensil or other conductor within the cooking device extensions 19 and 20 thereof disengage from the electric contacts provided at 29 and 34 and at 31 and 35, respectively, breaking the electric circuit to bus bars 25 and 27 and to contacts 21. Another safety feature is therefore provided by the present invention which prevents the users thereof from accidental electric shock.

When lid 17 is removed and plug 36 disengaged from contacts 32 and 33 base 10 as well as top 17 can be readily and easily cleaned. When lid 17 is removed the electric contacts 29 and 34 and 31 and 35 are open so that the bus bars 25 and 27 are not energized. Base 10 may then be cleansed with a non-conducting cleaner without fear of accidental contact with the bus bars 25 and 27 or contacts 21 should plug 36 be connected to the source of electric power and not disengaged from contacts 32 and 33.

In the embodiment shown in Figs. 6 and 7 electric wires 37 and 38 lead to cover 17 rather than to base 10 and may be removably connected thereto as by plug contact 36 engaging prong-type electrical contacts 40 and 41 which are mounted in an end of cover 17 and are electrically connected to sleeve contacts 42 and 43, respectively, also mounted in cover 17 adjacent a lower edge thereof. In this embodiment ends 29' and 31' are turned upwardly in groove 15 to form prong-type electrical contacts which, when cover 17 is in closed position and seated in grooves 13, 14, 15 and 16 enter sleeve contacts 42 and 43, respectively, to complete the electrical circuit to bus bars 25 and 27. Since sleeve contacts 42 and 43 are mounted within cover 17 and since the electric circuit is not completed between contacts 42 and 43 and ends 29' and 31' until cover 17 is in fully closed position, the user of the device is protected against accidental electric shock.

It should now be apparent that the present invention in every way satisfies the several objectives described above while satisfying the requirements for a safe electrical cooking device for use by the young and inexperienced.

Changes in or modifications to the above described illustrative embodiment of this invention may now be suggested to those skilled in the art without departing from the present inventive concept. Reference should therefore be had to the appended claims to determine the scope of this invention.

What is claimed is:

1. In an electrical cooking device for elongated food products, a dish-shaped base having spaced ends and having a substantially rectangular depression therein, a plurality of spaced electric contacts mounted on two opposed walls of said depression forming spaced opposed pairs of contacts with each pair of contacts adapted to receive an elongated food product therebetween, a bus bar electrically connecting said contacts on one side of said depression, a second bus bar electrically connecting said contacts on the opposite side of said depression, electrical extensions for said bus bars terminating in spaced insulated position in an end of said base, a pair of electrical contacts extending from said base and terminating therein and insulated from each other opposite and spaced from the ends of said extensions, a cover having spaced ends, removably mounted on said base enclosing and substantially preventing access to said first named electric contacts, when in closed position and electrical conducting means insulated from each other and carried by said cover on an end thereof engaging said extensions and said second named electrical contacts only when said cover is closed for completing the electrical circuit to said bus bars, said cover when in closed position extending completely around and downwardly below the top of said rectangular depression and in engagement with said base to prevent access to said rectangular depression around the edges of said cover.

2. A cooking device as described in claim 1 in which each of said electric contacts consists of a member terminating in a point and an electrically insulating coating on said member terminating short of the point thereof, the elongated food product being adapted to be impaled axially on said pointed member with the insulated portion thereof extending into said food product.

3. A cooking device as described in claim 1 having a continuous groove surrounding said depression in said base receiving said cover when said cover is in closed position.

4. A cooking device as described in claim 1 in which said means carried by said cover comprise spaced downwardly extending metallic members each engaging one of said extensions and the adjacent one of said second named contacts when said cover is closed.

5. A cooking device as described in claim 1 having a groove surrounding said depression in said base receiving said cover when said cover is in closed position, said means carried by said cover comprising spaced downwardly extending metallic members each engaging one of said extensions and the adjacent one of said second named contacts only when said cover is in said groove.

6. In an electrical cooking device for frankfurters, a dish-shaped base having spaced ends and having a substantially rectangular depression therein, two spaced parallel rows of spaced electric contacts mounted in said depression forming opposed pairs of contacts with each pair of contacts adapted to receive a frankfurter, a bus bar electrically connecting one of said rows of contacts, a second bus bar electrically connecting the other of said rows of electrical contacts, an upstanding switch element mounted in said base adjacent an end thereof for each of said bus bars, a cover having spaced ends, removably mounted on said base enclosing and substantially preventing access to said electric contacts when in closed position and electrically conducting means carried by said cover adjacent an end thereof engaging said switch elements only when said cover is in closed position for completing the electric circuit to said bus bars, said cover when in closed position extending completely around and downwardly below the top of said rectangular depression and in engagement with said base to prevent access to said rectangular depression around the edges of said cover.

7. A cooking device as described in claim 6 in which each of said electric contacts consists of a member terminating in a point coated with electrical insulation to adjacent its point, the frankfurter being adapted to be impaled axially on said pointed member with the coating of insulation extending into the frankfurter.

8. A cooking device as described in claim 6 having a groove in said base surrounding said depression and receiving said cover when said cover is in closed position said conducting means carried by said cover engaging said switch elements only when said cover is in said groove.

9. A cooking device as described in claim 6 having a groove in said base surrounding said depression and receiving said cover when said cover is in closed position, said switch elements comprising prong-type contacts mounted in said base and said electrically conducting means carried by said cover comprising electrical contacts on said cover engaging said prong-type contacts when said cover is in closed position, said electrical contacts on said cover being connected to a source of electrical energy.

References Cited in the file of this patent
UNITED STATES PATENTS

| | | |
|---|---|---|
| 1,993,353 | Young | Mar. 5, 1935 |
| 2,124,275 | Rowe | July 19, 1938 |
| 2,344,373 | Stainbrook | Mar. 14, 1944 |
| 2,889,765 | Yetter | June 9, 1959 |